United States Patent [19]

Stockwell

[11] 3,998,444
[45] Dec. 21, 1976

[54] WORK SUPPORTING JACK

[75] Inventor: Jay E. Stockwell, Pontiac, Mich.

[73] Assignee: F. Jos. Lamb Company, Warren, Mich.

[22] Filed: Jan. 22, 1976

[21] Appl. No.: 651,524

[52] U.S. Cl. ............................ 269/20; 248/412; 269/296; 269/310

[51] Int. Cl.² .......................................... B23Q 3/10

[58] Field of Search ............. 269/20, 27, 30, 289, 269/309, 310, 296; 248/411, 412, 402

[56] References Cited

UNITED STATES PATENTS

| | | | |
|---|---|---|---|
| 2,696,764 | 12/1954 | Sternbergh | 269/310 |
| 3,829,078 | 8/1974 | Claycomb | 269/310 |
| 3,858,867 | 1/1975 | Claycomb | 269/310 |
| 3,938,798 | 2/1976 | Solie et al. | 269/310 |

Primary Examiner—Al Lawrence Smith
Assistant Examiner—Robert C. Watson
Attorney, Agent, or Firm—Barnes, Kisselle, Raisch & Choate

[57] ABSTRACT

A pair of opposed plungers slideably arranged in a bore on a work-holding fixture have their confronting end faces inclined to the axis thereof in spaced apart relation. A key is disposed between the confronting ends of the plungers. The fixture is designed so that when a workpiece is placed thereon it depresses one of the plungers. Thereafter the other plunger is moved toward the key to shift the key laterally into engagement with the inclined end face of the depressed plunger. The end face of the latter is inclined at a wedge locking angle. Additional means having a wedge locking angle are provided to prevent movement of the second plunger in a direction away from the key.

15 Claims, 5 Drawing Figures

WORK SUPPORTING JACK

This invention relates to a jack for supporting and stabilizing a workpiece in a holding fixture while machining processes are being performed on the workpiece.

While being machined, workpieces are frequently retained in a holding fixture by resting the workpiece on two or more spaced apart pads on which the workpiece is clamped. The work pads on the holding fixture are usually small in area in order to facilitate cleaning of their operative faces and also to minimize the contact area of the locating surface on the workpiece. This reduces to a minimum the distortion resulting from possibly non-planar locating surfaces on the workpiece. However, with such an arrangement relatively large portions of the workpiece are unsupported and subject to deflection by the forces created during the machining operation. It is desirable to stablilize these unsupported portions by suitable means. When these unsupported portions are of irregular contour their locating positions are not readily predetermined and, therefore, a fixed height support cannot be used. Each successive workpiece may require a different height of supporting device. Another requirement is that, regardless of the device used to support the workpiece, it must not exert an excessive amount of initial contacting force on the workpiece. If the supporting device bears against the workpiece with excessive force, the workpiece will distort from its normal configuration and the machining operation will be performed under this abnormal condition. Thereafter, when the finished workpiece is removed from the work-holding fixture, it will return to its normal shape and the machined portion will not conform to the desired configuration and size.

A variety of devices have been used in the past to solve the above-mentioned problems, but none has been completely satisfactory for various reasons. Such devices have usually employed some force producing means (such as a wedge and a spring) for actuating a support member into contact with the workpiece. If the force producing means exerts too much pressure it will cause the support member to exert an excessive force on and distort the workpiece.

Another reason that some of the previously employed work-supporting devices have not been satisfactory resides in the fact that frequently during machining the workpiece has generated within it from the action of the cutting tool vibrations which at least momentarily separate the workpiece from the support member. For example, a resiliently loaded wedge will cause the support member actuated by the wedge to follow the displaced surface of the workpiece and will not allow it to return. This distorts the workpiece from its true shape and will continue during successive pulsations until the workpiece resists such further distortion. This is particularly true when the natural frequency of the clamped workpiece matches the frequency generated by the cutting elements of a rotating cutting tool.

It is an object of this invention to overcome the disadvantages referred to above by providing a workpiece supporting jack that is self-locating without applying forces to the workpiece of a sufficient magnitude to distort it.

It is another object of this invention to positively lock the work-supporting member of the jack against further movement in any direction after its initial exact location.

A further object of the invention resides in the provision of a supporting jack designed to maintain its original locked position without the aid of an external power supply so that the jack may be incorporated in a work-holding pallet adapted to be transported from station to station in a multiple operation machine.

Further objects and advantages of the present invention will become apparent from the following description and accompanying drawings, in which.

Figure 1:
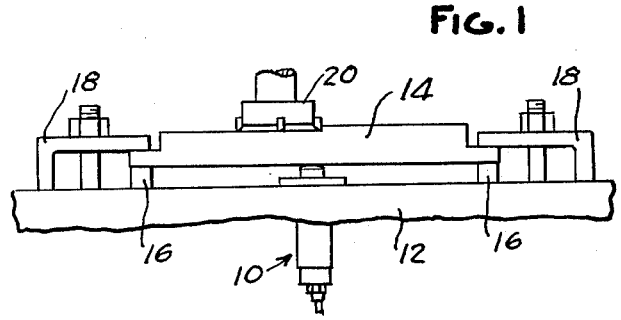
FIG. 1 is a fragmentary elevational view of a work-holding fixture embodying the present invention.

A typical application of the work-supporting jack of this invention is illustrated in FIG. 1 wherein the jack is generally designated 10. Jack 10 is mounted in a support plate 12 on which a workpiece 14 to be machined is clamped. Workpiece 14 is supported adjacent its opposite ends by two or more pads 16 on which it is firmly secured by clamps 18. In the arrangement illustrated in FIG. 1 the upper face of workpiece 14 is being machined by a milling cutter 20. Jack 10 is located on support plate 12 to contact the underside of workpiece 14 at an otherwise unsupported portion thereof to prevent the workpiece from deflecting as the milling cutter 20 traverses the upper face thereof.

Figure 2:
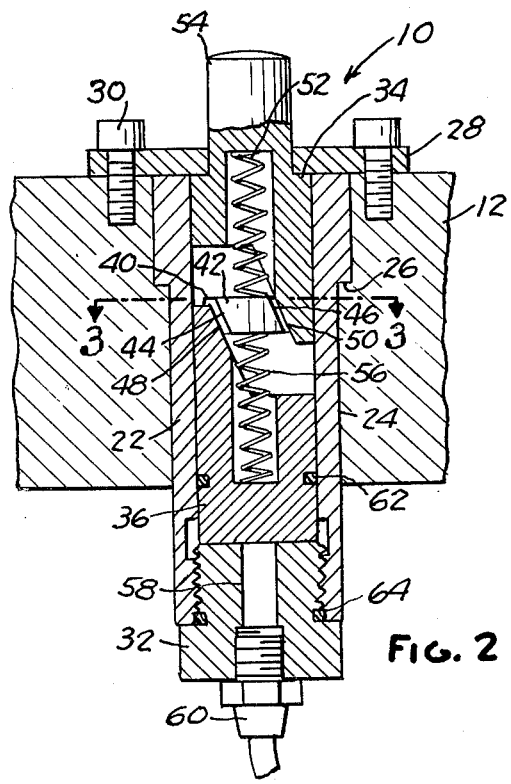
FIG. 2 is a fragmentary vertical sectional view of a work-holding jack according to the present invention.
Figure 3:
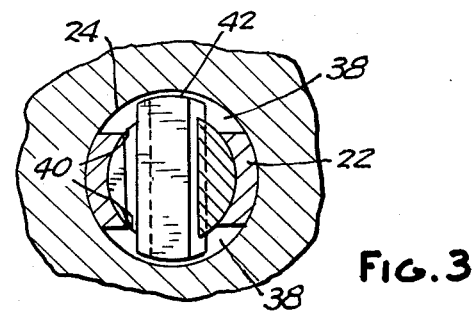
FIG. 3 is a sectional view taken along the line 3—3 in FIG. 2.

Referring now to FIG. 2, jack 10 includes an outer cylindrical body 22 fitted into a bore 24 in support plate 12. Body 22 is seated in bore 24 by means of a shoulder 26 and is retained in place by a cap 28 secured to the top face of support plate 12 by screws 30. The lower end of body 22 is closed by a stop plug 32. Within body 22 there are slideably arranged an upper plunger 34 and a lower plunger 36. Diametrically opposite sides of body 22 are machined to form slots 38 which extend transversely of the axis of body 22 and through the side wall thereof so as to define a pair of diametrically opposed rectangularly shaped openings 40 in body 22. A key 42 traverses the bore of body 22. The opposite ends of key 42 project into openings 40 and retain the key in a position fixed axially of body 22. Radial movement of key 42 through openings 40 is limited by bore 24 and radial movement of key 42 in a direction perpendicular thereto is limited by the ends of rectangular openings 40.

As is shown in FIG. 2, key 42 is located between the confronting ends of plungers 34,36. The opposing side faces 44,46 of key 42 are inclined at an acute angle to the axis of body 22. The adjacent faces 48,50 of plungers 36,34, respectively, are similarly inclined. Plunger 34 is normally urged upwardly by a relatively light spring 52 so that the work-supporting end 54 thereof protrudes upwardly through cap 28. Plunger 36 is normally urged downwardly by a heavier spring 56 so that the lower end of plunger 36 will seat on the upper end of plug 32. The adjacent ends of springs 52,56 bear against the top and bottom faces of key 42.

Plug 32 has a central passageway 58 therein communicating at one end with the portion of the bore of body 22 below plunger 36. At its other end passageway 58 is connected by a fitting 60 with a suitable source of fluid under pressure. Seals 62,64 prevent the leakage of fluid past plunger 36 and plug 32.

In the arrangement illustrated in FIGS. 1 through 4 the side faces 44,46 of key 42 are inclined to the axis of bore 24 at a wedge locking angle. Wedge locking angles vary in size depending upon the frictional characteristics of the contacting wedge surfaces and the forces applied thereto. In the case of smooth steel surfaces a wedge locking angle is commonly considered to be in the range of 6° to 7°. Accordingly, the angles actually illustrated in the drawings are exaggerated if the parts are formed of steel. However, the factors which determine the size of wedge locking angles for different materials in different applications are well understood by those skilled in the art and a further explanation thereof is deemed to be unnecessary. It is understood, of course, that faces 44,46 are ground smooth and faces 48,50 are also ground smooth so as to permit co-planar engagement of the confronting end faces of plungers 34,36 with the side faces of key 42 when the two plungers are moved axially toward each other.

Figure 4:
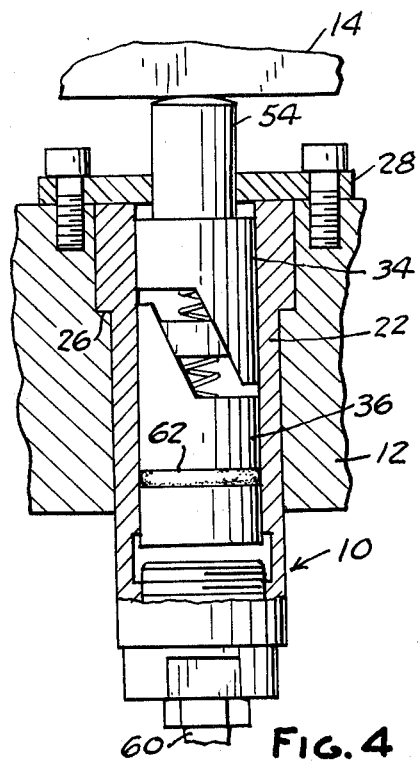
FIG. 4 is a fragmentary sectional view similar to FIG. 2 showing the jack in the locked work-supporting condition.

FIG. 4 illustrates the operative condition of jack 10. In this showing workpiece 14 has been placed on pads 16 so as to engage the outwardly projecting work-supporting end 54 of plunger 34 and thereby depress the plunger. After the workpiece is clamped on pads 16 as illustrated in FIG. 1 fluid pressure is introduced to the underside of plunger 36 through fitting 60. This pressure is sufficient to overcome the force exerted on plunger 36 by spring 56. Thus, plunger 36 moves upwardly. Face 48 on plunger 36 engages face 44 of key 42 and shifts the key to the right as illustrated in the drawings until face 46 of key 42 engages face 50 of plunger 34. Since the above described faces are inclined to the axis of the two plungers at wedge locking angles it follows that, even though plunger 36 is urged upwardly by fluid pressure against the bottom side thereof, key 42 does not exert any axial upward force on plunger 34. Consequently, plunger 34 is locked firmly in the position it assumes as dictated by the placement of workpiece 14 on the fixture. The only upward force exerted against workpiece 14 by jack 10 is the original force required to displace plunger 34 downwardly and compress the relatively light load of spring 52. Any downward force exerted by the milling cutter 20 will not tend to displace plunger 34 downwardly because the lateral force transmitted to key 42 by plunger 34 and exerted against the inclined face 48 cannot displace plunger 36 downwardly. Once the jack assumes the locked position illustrated in FIG. 4, if the vibrating motions set up in the workpiece by the milling cutter tend to separate the workpiece from the jack assembly, plunger 34 will have no tendency to follow it; it will simply stay in its original fixed location and remain there by reason of the wedge locking action at faces 46,50.

It will be understood, of course, that after the machining operation is completed and the workpiece removed from the fixture the jack may be reset to its original position illustrated in FIG. 2 by releasing the pressure on the underside of plunger 36, opening a valve in the fluid system, for example. This will allow plunger 36 to return to its seated position on plug 32 by the force of the relatively strong spring 56 which is sufficient to overcome any locking forces generated between surfaces 48 and 44. When the force on key 42 generated by the inclined face 48 of plunger 36 is removed, the light spring 52 is sufficient to raise plunger 34 to its uppermost position shown in FIG. 2 and the assembly is then ready for placement of the next workpiece on the fixture.

It will be realized that the inclination of faces 44,48 need not be exactly the same as the inclination of faces 46,50. The size of the wedge locking angle is determined to some extent by the forces applied. This is true because the action of wedge locking angles is based on friction between the contacting surfaces. Thus, other factors remaining the same, if the force tending to release the wedge lock increases substantially, the size of the angle must be reduced.

Figure 5:
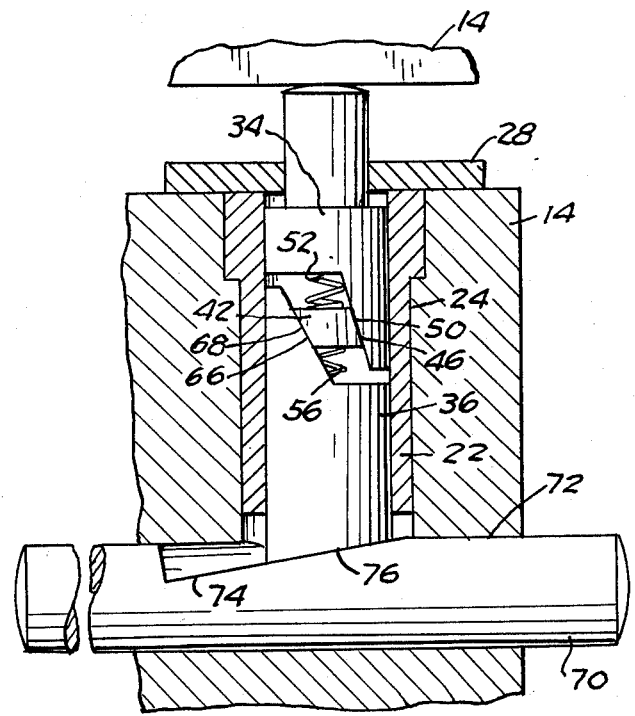
FIG. 5 is a fragmentary vertical sectional view of a modified form of jack according to the present invention.

It will also be appreciated that in order to obtain a wedge locking action between plunger 34 and key 42 it is only essential that faces 46,50 be inclined at a locking angle and that means are provided for preventing key 42 from shifting laterally to the left as viewed in FIG. 2. Thus, as shown in FIG. 5, while faces 46 and 50 are inclined at locking angles, on the opposite side of key 42 the faces 66,68 on key 42 and plunger 36 are inclined at a much greater angle and do not provide a locking action between key 42 and plunger 36. However, in this embodiment a third plunger 70 is slideably arranged in a bore 72 extending transversely of bore 24. Plunger 70 has an inclined face 74 and the lower end face 76 of plunger 36 is similarly inclined. In this arrangement face 74 is inclined to the longitudinal axis of plunger 70 at a wedge locking angle.

With the embodiment shown in FIG. 5, when a workpiece 14 is placed on the fixture as illustrated in FIG. 1, the upper plunger 34 will be depressed as previously described. Thereafter, plunger 70 is shifted to the left as viewed in FIG. 5 to displace plunger 36 upwardly an extent sufficient to cause the inclined face 68 of plunger 36 to shift key 42 to the right to a position wherein faces 46,50 are in co-planar engagement. Plunger 70 can be shifted to the left in this manner by any suitable means (such as an impulse from a cylinder or other device, not shown). In any event, when the parts assume the position shown in FIG. 5 the assembly is in the locked condition. Any downward force exerted by the workpiece on plunger 34 is transmitted through both plungers and key 42 to the inclined face 74 of plunger 70. However, since face 74 is inclined to the axis of plunger 70 at a wedge locking angle a downward force on this face will not tend to shift the plunger axially. Thus, plunger 70 will remain in a fixed position until an impulse is applied thereto to shift it in a direction toward the right, thus breaking the locking action at the faces 74,76 and thereby releasing both plungers under the action of springs 52,56 as previously described. The arrangement shown in FIG. 5 is admirably suited where the work-holding fixture is in the form of a pallet which is normally used where it is required to transport the workpiece through successive stations in a multiple operation machine. However, it will be understood that even the arrangement shown in FIGS. 1 through 4 can be applied to a pallet-type work support if the fluid system is arranged so that it can be charged at a loading station, disconnected from the source of pressure and released at an unloading station.

I claim:

1. A work-supporting jack comprising a support member having a bore therein, first and second opposed plungers axially slideable in said bore toward and away from each other, the confronting ends of said plungers comprising a pair of confronting faces which are inclined to the axis of the bore at an acute angle and which are spaced apart transversely of said bore, a key disposed in the space between said confronting faces, said key being fixed axially of the bore and having opposed faces adapted to be abutted by said inclined end faces of the plungers, said key being movable transversely of the bore in response to abutment of either of said opposed faces with said end faces of the plungers, the first plunger having its other end projecting axially outward of said bore for supporting engagement with a workpiece, means biasing said first plunger axially outwardly of said bore, said end face of said first plunger being inclined to the axis of the bore at a wedge locking angle relative to the key so that movement of the key into abutting engagement with the inclined end face of the first plunger will not produce axial movement of the first plunger outwardly of the bore, means for moving the second plunger in a direction toward the first so that the inclined end face of the second plunger bodily moves the key transversely of the bore into abutting relation with the adjacent inclined end face of the first plunger, and means for locking the second plunger against axial movement in a direction away from the first plunger when said opposed faces of the key are in abutting engagement with the inclined end faces of both plungers, whereby, when the first plunger is moved axially inwardly of said bore against said biasing means by a workpiece positioned against the outer end of the first plunger and the second plunger is moved toward the first to interengage the opposed faces of the key with the inclined end faces of the two plungers, the wedge locking angle on the end face of the first plunger cooperates with the locking means for the second plunger to lock the first plunger in an axially fixed position in said bore.

2. A work-supporting jack as called for in claim 1 wherein said last-mentioned means includes said inclined end face of the second plunger, said last-mentioned end face being inclined to the axis of said bore at a wedge locking angle relative to the key so that a force on the key in a direction toward the inclined end face of the second plunger does not tend to displace the second plunger axially in a direction away from the key.

3. A work-supporting jack as called for in claim 1 wherein said last-mentioned means comprises a third plunger in said support member movable in a path transversely of the first two plungers, said third plunger having a face thereon inclined at an acute angle to the axis of the third plunger, said second plunger having a portion thereof engaging said face of the third plunger so that axial reciprocation of the third plunger produces axial reciprocation of the second plunger, said face of the third plunger being inclined to the axis of the third plunger at a wedge locking angle relative to the second plunger so that a force on the second plunger toward said inclined face of the third plunger will not tend to displace the third plunger axially.

4. A work-supporting jack as called for in claim 3 wherein the portion of the second plunger engaging said face of the third plunger comprises a face on the second plunger disposed in the plane parallel to said face of the third plunger.

5. A work-supporting jack as called for in claim 3 wherein the portion of the second plunger engaging said face of the third plunger comprises the other end of the second plunger.

6. A work-supporting jack as called for in claim 1 including means biasing said first plunger in a direction outwardly of said bore away from said key.

7. A work-supporting jack as called for in claim 1 including means for biasing said two plungers in a direction away from said key.

8. A work-supporting jack as called for in claim 7 wherein the biasing means on the first and second plungers comprise compression springs.

9. A work-supporting jack as called for in claim 7 wherein the spring biasing the first plunger is weaker than the spring biasing the second plunger.

10. A work-supporting jack as called for in claim 1 wherein said opposed faces of said key are disposed in planes parallel to the adjacent inclined faces of the two plungers.

11. A work-supporting jack as called for in claim 7 including means limiting movement of the two plungers in a direction away from each other under the influence of said biasing means.

12. A work-supporting jack as called for in claim 1 wherein said support member comprises a sleeve having a cylindrical side wall.

13. A work-supporting jack as called for in claim 12 wherein said sleeve is formed with a pair of diametrically opposed slots in the side wall thereof, said slots extending transversely of the axis of said bore, said key having its ends disposed in said slots to prevent movement of the key axially of said bore and to permit movement of the key in a direction transversely of said bore.

14. A work-supporting jack as called for in claim 1 wherein said means for moving said second plunger toward the key comprises means forming a pressure fluid chamber communicating with said bore at the other end of the second plunger and means for connecting said chamber with a source of fluid under pressure.

15. A work-supporting jack as called for in claim 1 wherein said inclined faces of the two plungers axially overlap each other and said key when the confronting end faces of the two plungers engage with the opposed faces of the key.

* * * * *